(No Model.) 5 Sheets—Sheet 1.
S. V. KENNEDY.
DISCHARGING MECHANISM FOR GRAIN BINDERS.
No. 316,550. Patented Apr. 28, 1885.
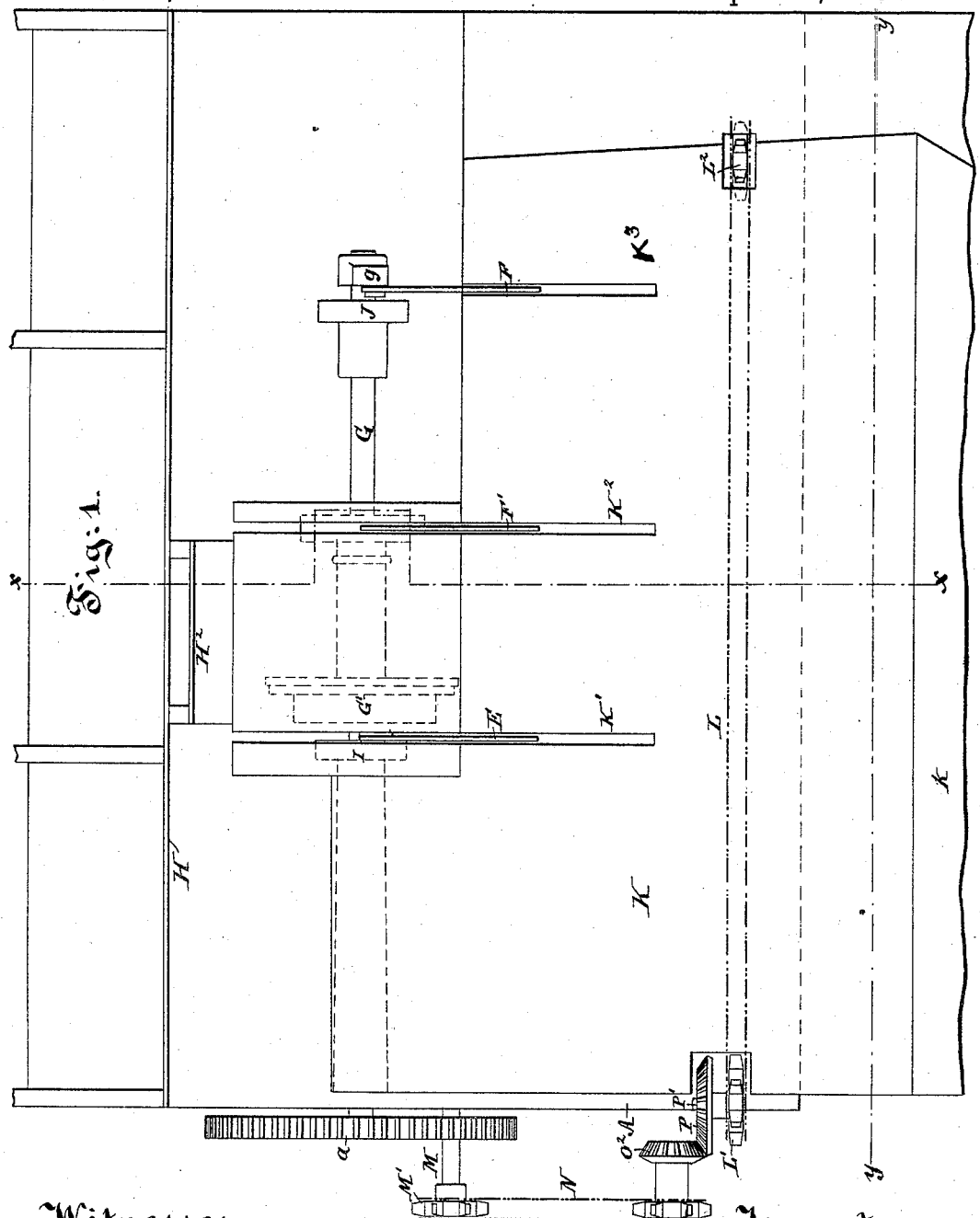
Witnesses:
R. C. Howes
Millard Far
Inventor:
Samuel V. Kennedy
Per Edw. E. Quimby
Atty.

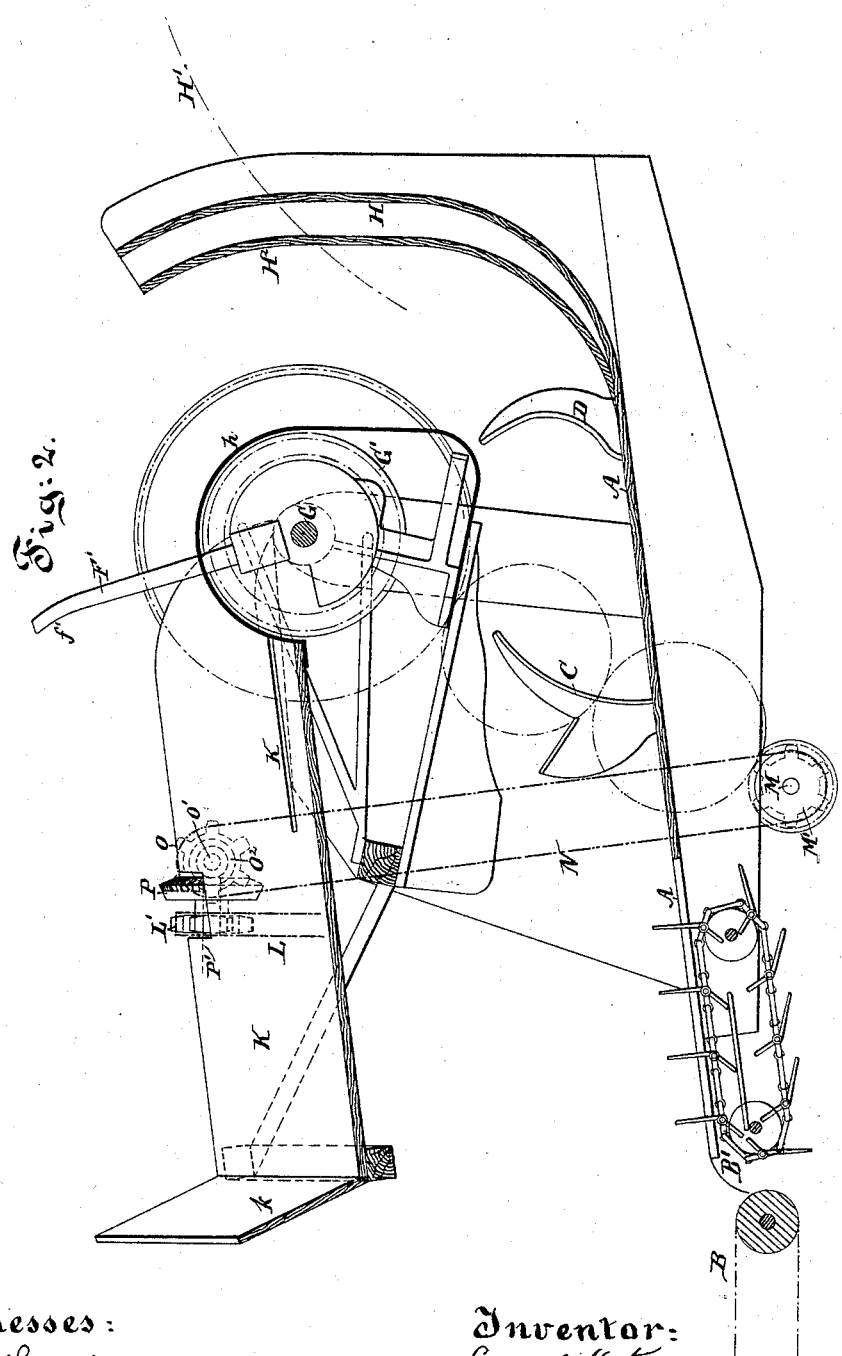

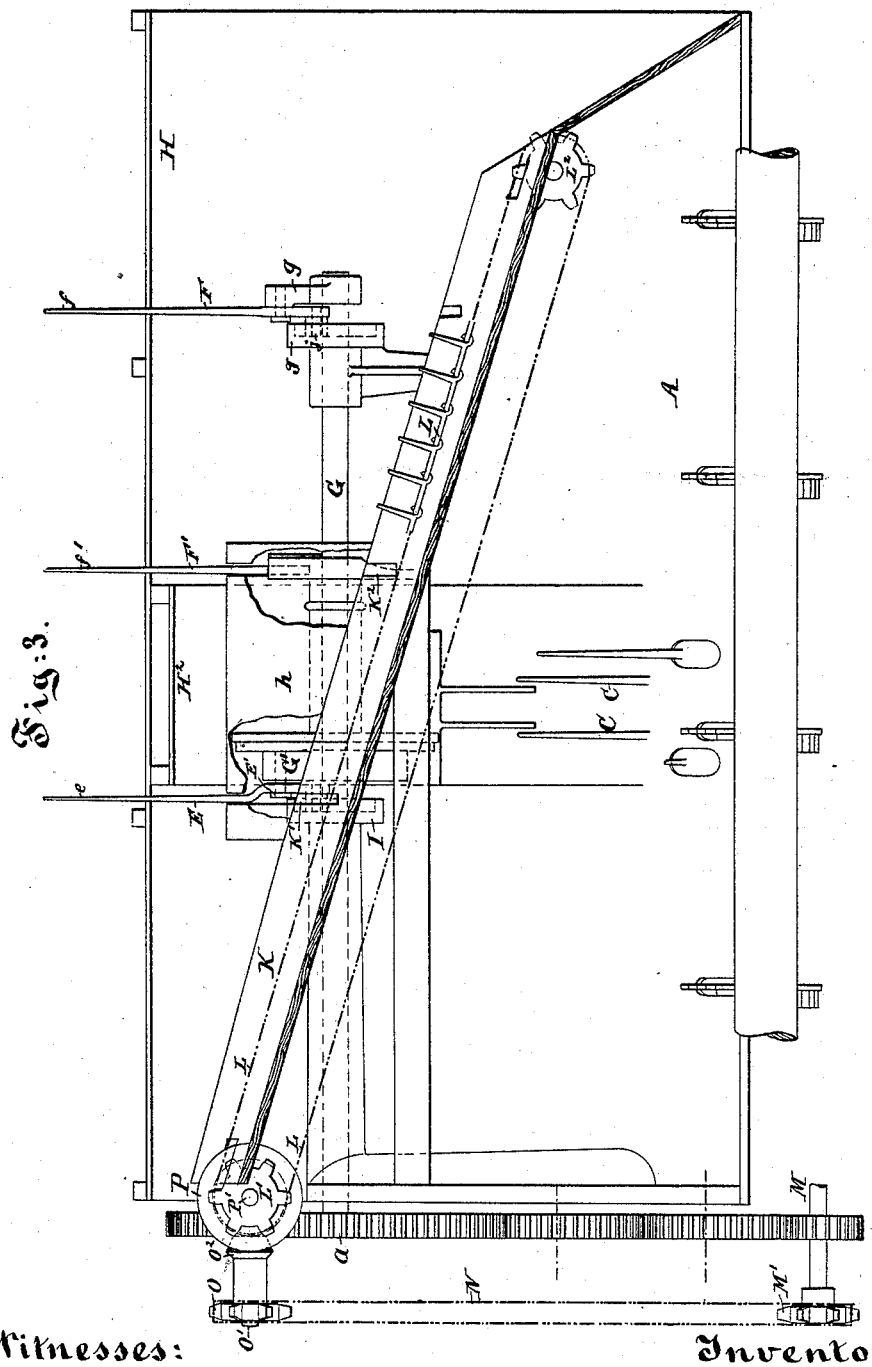

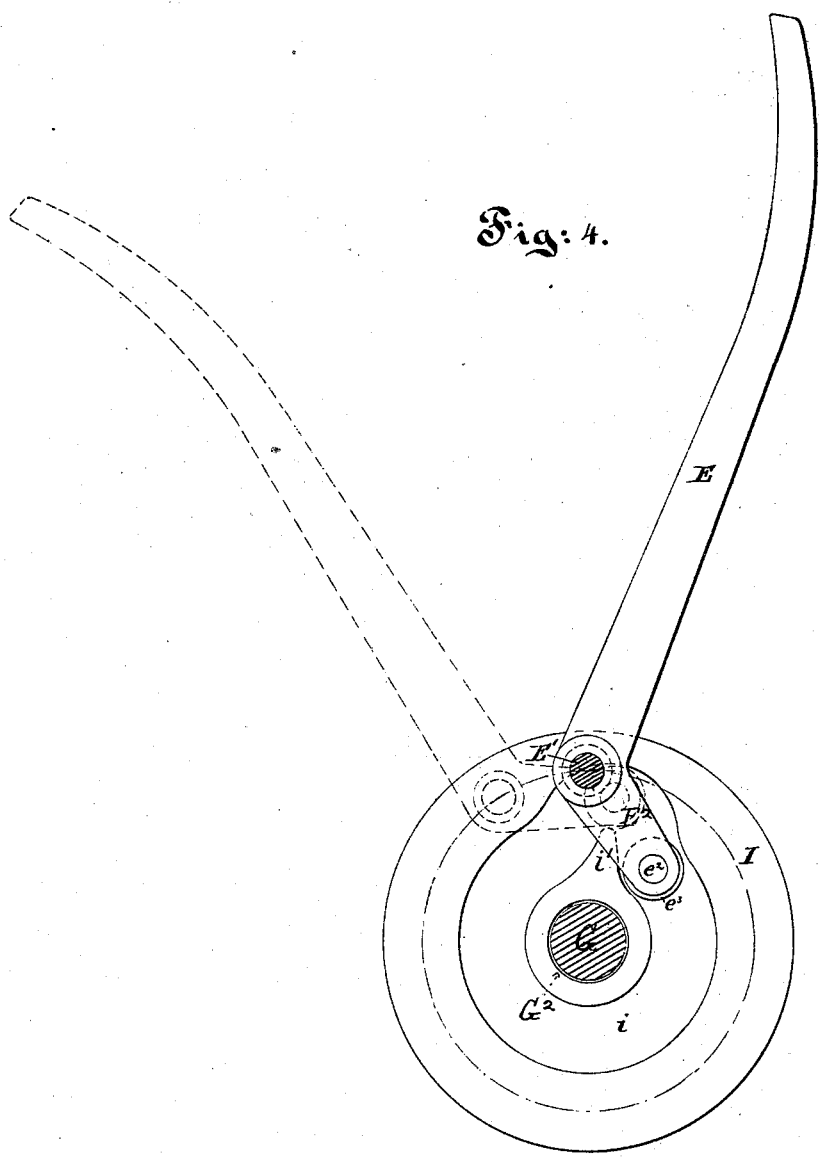

(No Model.)
S. V. KENNEDY.
DISCHARGING MECHANISM FOR GRAIN BINDERS.
No. 316,550. Patented Apr. 28, 1885.
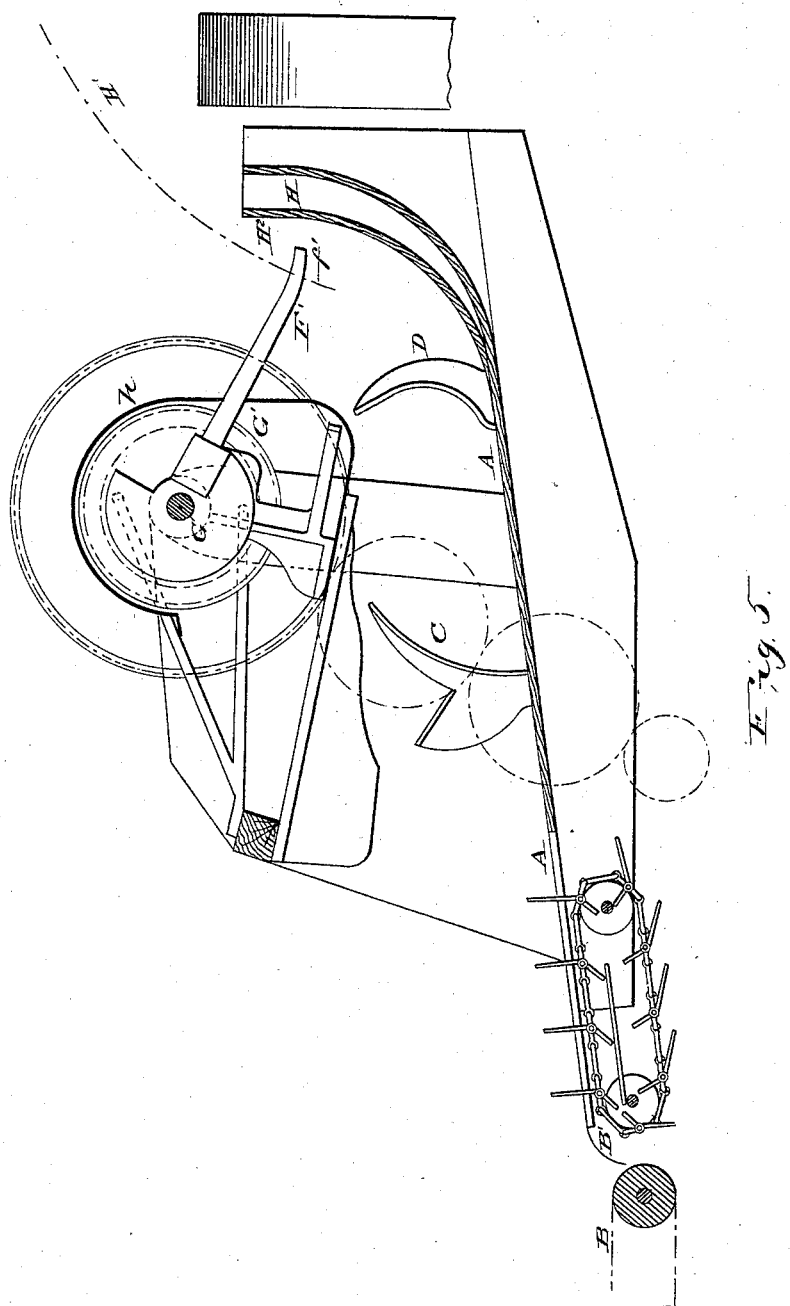
Witnesses:
Inventor.
Samuel V. Kennedy,
Per Edw. E. Quimby,
Atty.

UNITED STATES PATENT OFFICE.

SAMUEL V. KENNEDY, OF MINNEAPOLIS, MINNESOTA, ASSIGNOR TO THE MINNEAPOLIS HARVESTER WORKS, OF SAME PLACE.

DISCHARGING MECHANISM FOR GRAIN-BINDERS.

SPECIFICATION forming part of Letters Patent No. 316,550, dated April 28, 1885.

Application filed September 14, 1883. (No model.)

*To all whom it may concern:*

Be it known that I, SAMUEL V. KENNEDY, of Minneapolis, Minnesota, have invented certain Improvements in Discharging Mechanism for Grain-Binders, of which the following is a specification.

My invention relates to mechanism for discharging the bound bundles of grain from a self-binding harvester, and is especially applicable to so-called "low-down" binders, in which the cut grain is delivered sidewise by the platform-carrier directly to a deck on a level with or only slightly higher than the platform, upon which deck the grain is supported during the formation and binding of the bundles.

My mode of discharging the bound bundle consists in tossing it from the machine in a prescribed direction by means of suitably-curved rotating tossing-arms, which, at the proper time, preferably by moving first with comparative slowness and then more rapidly, lift the bundle from the gavel-receptacle to a predetermined elevation, at which point the speed of rotation of one or both of the rotating arms is diminished, whereby the bundle is tossed in the desired direction—as, for example, over the drive-wheel, &c., to the ground, or over the top of the binding mechanism down upon a chute, or, if desired, a carrier-belt erected above the binder deck and platform and inclining from the front downward to the rear of the machine. By this mode of discharging the bundles I am enabled to diminish the width of self-binding harvesters by performing the binding operation in close proximity to the platform.

The accompanying drawings represent my invention applied to grain-binding mechanism like that shown and described in Letters Patent of the United States No. 212,420, dated February 18, 1879.

The drawings show so much of the binding mechanism and of the harvester as is essential to illustrate the application of my invention and its mode of operation.

Thus Figure 1 is a top view. Fig. 2 is a vertical section through the line X X on Fig. 1. Fig. 3 is a vertical section through the line Y Y on Fig. 1, and Fig. 4 is an elevation of the stationary cam for giving to the tossing-arms the sudden accelerated motion required to enable them to perform their function of tossing the bundle of bound grain in the designed direction. Fig. 5 is a vertical section corresponding with Fig. 2, in which modified mechanism for discharging the bundle over the wheel is shown.

In the drawings, the deck A of the binder is represented as being slightly inclined upward from the platform-carrier B, by the operation of which the cut grain is delivered sidewise upon the deck of the binder, along which the grain is moved by the carrier-chain B' to a point within the range of movement of the vibrating packers C C. The packers collect and form the gavel in the usual way against the compressor D, and the binding-cord is then carried around the bundle and knotted by the usual vibrating binder-arm and knot-tying mechanism. The bundle being then ready for discharge from the binding-receptacle, the compressor D is freed, so that it can swing out of the way, and the bundle is swept out of the receptacle by the rotation of the tossing-arms E, F, and F', which are suitably connected with and rotated by the knotter-operating shaft G. The arms E, F, and F' are slightly curved and catch the bundle upon their concave edges $e$, $f$, and $f'$. This curvature of the arms is for the purpose of holding the bundle against the action of centrifugal force, and thereby enabling the arms to retain it until their motion is arrested, as hereinafter described, when the bundle, by virtue of the momentum it has acquired, will leave the arms in the designed tangential direction. When the curvature of the arms is comparatively slight, as shown in the drawings, I employ a curved shield, H, which is substantially parallel with the path through which the free ends of the arms move. This shield is a continuation of the drive-wheel side of the deck A, and curves upwardly therefrom to a greater or less distance, according to the direction which is to be given by the tossing-arms to the bundle. Thus, if the bundle is to be thrown over the drive-wheel, the accelerated motion of the tossing-arms will be arrested when they reach a position in which they incline downwardly from the knotter-operating shaft toward the drive-wheel, at an angle of, say, forty-five degrees, in which case the curved shield H will terminate at a point radially in line with the said position of the tossing-arms. In this case the momentum imparted to the bundle by the movement of the tossing-arms will cause it to be thrown over the drive-wheel in a direction substantially such as indicated by the dotted line H' on Fig. 2. In order to increase the momentum of the bundle, and also in order to increase the height to which the butt-end of the bundle is thrown, so that it can more certainly be thrown over the drive-wheel, and also so that the tossing-arms need not be brought absolutely to rest at the point where the bundle is discharged from them, I give the arm E alone, which carries the butt-end of the bundle, a short range of sudden accelerated motion, by which the butt-end of the bundle is tossed higher, and there is imparted to the bundle a tendency to turn endwise as it is thrown from the machine. By this means, in falling from the machine, the bundle is given an obliquely rearward direction, which more certainly clears it from the drive-wheel. To give this accelerated motion to the arm E, I provide it with an independent axis of oscillation by securing it to the front face of the knotter cam-wheel G' by means of the pivot E', inserted through a hole formed in the arm E a short distance from its inner end. The arm E is thus converted into a lever of the first order, having the pivot E' for its fulcrum. Power to operate it is applied to the end of the crank-arm $E^2$, which is bent to an angle with the longer arm, E, as shown in detail in Fig. 4, which also shows, in transverse section, the pivot E' and the knotter-operating shaft G, the latter passing loosely through the central aperture, $G^2$, in the stationary cam I, affixed to the frame of the binder, and having formed in its face the cam-groove $i$. The crank-pin $e^2$ is inserted through the anti-friction roller $e^3$, which is engaged by the cam-groove $i$, the greater portion of which is concentric, while the remaining portion bends sharply outward, forming the nose $i'$. As the knotter-operating shaft G revolves, the arm E is carried bodily around by virtue of its pivotal connection with the cam-wheel G', and so long as the friction-roller $e^3$ is engaged by the concentric portion of the groove $i$ the motion of the arm E is uniform; but when the friction-roller $e^3$ is brought into contact with the nose $i'$ the crank-arm $E^2$ is detained, and as the rotation of the knotter-operating shaft G continues the arm E is thus made to rock upon its fulcrum. The pivot E' and the free end of the arm E are thereby moved suddenly and quickly forward a short distance, thus giving to the butt-end of the bundle the toss which has been described. I therefore designate the stationary cam I a "tossing-cam."

When it is desired to discharge the bundles from the rear of the machine, between the binding mechanism and the grain-wheel, the shield H is continued upward, as shown in Fig. 2, to a sufficient distance to insure the retention of the bundle by the packing-arms until it has been carried to a point above the top of the binder from which it can be thrown by the tossing-arms down upon the inclined chute K, extending from the front of the machine downward to the rear of the machine. The grain-wheel side of the chute K is provided with the elevated retaining-board $k$, to prevent the bundles from being thrown over the edge of the chute by the tossing-arms, and the chute is provided with the slots K' $K^2$ $K^3$, to allow for the passage of the tossing-arms.

I prefer to have the chute K also incline toward the grain-wheel, and to provide it with an inclined carrier chain or belt, L, to assist in carrying the sheaves downward to the rear of the machine. The belt L is stretched from the sprocket-wheel L' to the sprocket-wheel $L^2$, and may be conveniently driven from the counter-shaft M by means of the sprocket-wheel M', affixed thereto and engaging the chain N, for actuating the sprocket-wheel O, affixed to the counter-shaft O', provided with the bevel-gear $O^2$, meshing into the bevel-pinion P, mounted upon the shaft P' of the sprocket-wheel L'.

The curved shield H may be provided upon its concave side with the projecting rib $H^2$, arranged in alignment with the plane of motion of the cord-arm, and hence adapted to bear upon the part of the bundle or sheaf which has been compressed by the binding-cord. The knotting mechanism may be partially inclosed by the shield $h$, extending from the top of the gavel-receptacle to the drive-wheel edge of the chute K, the shield $h$ being of course suitably slotted to afford spaces for the movements of the various vibrating or rotating arms.

The tossing-arm F, which supports the head end of the sheaf, may also be converted into a lever of the first order and be given a short range of accelerated motion, like the tossing-arm E, as illustrated in Figs. 1 and 3, in which the tossing-arm F is represented as pivoted to a crank-arm, $g$, affixed to the rear end of the knotter-operating shaft, and a stationary cam, J, which is similar to the cam I, is represented as affixed to the frame of the binder in suitable position to engage an anti-friction roller upon the pin $j$, projecting laterally from the inner end of the arm F. The two cams I and J may be alike in the form of their noses, if desired, or may be made with noses of different forms, for causing one tossing-arm to have a greater range of accelerated motion or to move more rapidly than another tossing-arm.

It will be understood that the discharge of the sheaf from the tossing-arms is effected by either arresting the rotatory movement of the arms at a given point or by diminishing the velocity of the rotatory movement of one or more of the arms, and is due to the momentum previously imparted to the sheaf. The knotter-operating shaft in the usual way rotates intermittingly, making one complete revolution each time a bundle is bound. As the tossing-arms come to rest at the end of each revolution of the said shaft, they are so placed upon it as to come to rest at the point from which it is intended that the sheaf shall be discharged from them. The momentum of the sheaf will also cause its discharge if the speed of rotation of the tossing-arms, or either of them, be suddenly diminished, and it will be seen that such diminution of the speed of movement of either of the tossing-arms results from the traveling of its cam-pin from the extremity of the nose of the tossing-cam toward the middle of that cam.

I claim as my invention—

1. In discharging mechanism for grain-binders, two or more suitably-curved rotating discharging-arms for lifting and tossing the bound sheaf in a prescribed direction, means for rotating the said arms, and means for imparting to one or more of them a short range of accelerated motion, whereby the bound sheaf is discharged when such motion is checked.

2. Two or more suitably-curved rotating arms for lifting the bound sheaf, and means for checking or slowing the movement of the said arms at a prescribed point in their paths of rotation, whereby the sheaf is tossed and discharged from such point by the momentum which has been imparted to it by the previous motion of the arms.

3. In combination with mechanism for moving a bound sheaf from the gavel-receptacle over the top of the binder and toward the grain-wheel, a rearwardly-inclined chute for conducting the bound sheaf to the ground in the rear of the machine between the binder and grain-wheel.

SAMUEL V. KENNEDY.

Witnesses:
C. A. ANDERSON,
W. A. GOODRICH.